US012807243B2

(12) United States Patent
Bui-Van et al.

(10) Patent No.: US 12,807,243 B2
(45) Date of Patent: Nov. 24, 2026

(54) VEHICLE SPOILER ASSEMBLY

(71) Applicant: AGC GLASS EUROPE, Louvain-la-neuve (BE)

(72) Inventors: Hà Bui-Van, Louvain-la-neuve (BE); Rémi Sarkis, Louvain-la-neuve (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 280 days.

(21) Appl. No.: 18/576,629

(22) PCT Filed: Jul. 8, 2022

(86) PCT No.: PCT/EP2022/069082
§ 371 (c)(1),
(2) Date: Jan. 4, 2024

(87) PCT Pub. No.: WO2023/281060
PCT Pub. Date: Jan. 12, 2023

(65) Prior Publication Data

US 2024/0317330 A1 Sep. 26, 2024

(30) Foreign Application Priority Data

Jul. 9, 2021 (EP) .................................... 21184661

(51) Int. Cl.
*B62D 35/00* (2006.01)
*H01Q 1/32* (2006.01)
*H01Q 21/28* (2006.01)

(52) U.S. Cl.
CPC ........... *B62D 35/007* (2013.01); *H01Q 21/28* (2013.01); *H01Q 1/3275* (2013.01)

(58) Field of Classification Search
CPC .... B62D 35/007; H01Q 21/28; H01Q 1/3275; H01Q 1/521; H01Q 5/40; Y02T 10/82
See application file for complete search history.

(56) References Cited

U.S. PATENT DOCUMENTS 6,433,749 B1 8/2002 Thompson
6,853,341 B1 * 2/2005 Hellgren .................. H01Q 9/42 343/742

(Continued)

FOREIGN PATENT DOCUMENTS

CN 112542691 A 3/2021
EP 1 088 369 A1 4/2001
WO WO 2020/089586 A1 5/2020

OTHER PUBLICATIONS

International Search Report issued Oct. 10, 2022 in PCT/EP2022/069082, filed on Jul. 8, 2022, 4 pages.

*Primary Examiner* — Yanick A Akaragwe
(74) *Attorney, Agent, or Firm* — Oblon, McClelland, Maier & Neustadt, L.L.P.

(57) ABSTRACT

A spoiler assembly for a vehicle, the assembly including (a) a spoiler housing having left and right extremities and having a lower part and a cover part, the lower part having an inner surface facing an inner surface of the cover part; and (b) a plurality of antenna elements. The plurality of antenna elements is arranged on a surface of the spoiler housing with the antenna elements working at different range of frequencies. The spoiler housing has at least a central area and at least one lateral area on both sides of the central area and in the extremities of the spoiler housing. In the central area, at least one satellite antenna element is provided, and in at least one lateral area at the left and the right extremities of the spoiler housing, at least one cellular antenna elements and/or telematic antenna elements are provided.

20 Claims, 2 Drawing Sheets

(56) References Cited

U.S. PATENT DOCUMENTS

| | | | | |
|---|---|---|---|---|
| 6,927,736 | B1 | 8/2005 | Kornbau et al. | |
| 2002/0190489 | A1 | 12/2002 | Lee | |
| 2020/0185818 | A1 * | 6/2020 | Kim | H01Q 1/241 |
| 2021/0387684 | A1 * | 12/2021 | Smith | B62D 35/007 |

* cited by examiner

VEHICLE SPOILER ASSEMBLY

CROSS REFERENCE TO RELATED APPLICATIONS

This application is a National Stage entry under 35 U.S.C. § 371 of PCT/EP2022/069082, filed on Jul. 8, 2022, and claims priority to EP Patent Application No. 21184661.3, filed on Jul. 9, 2021, the entire contents of which are incorporated herein by reference.

FIELD OF THE INVENTION

The present invention relates to a spoiler assembly for a vehicle. Aspects of the invention also relate to a vehicle having a spoiler assembly. Because antennas cannot be installed in the visible area of glazing, limited antennas are found on vehicle glazing, such as broadcast antenna integrated with heating grid. Thus, the shark-fin is generally considered as a viable place for most of the telematics antennas as well as satellite antennas.

The advantage of shark-fin is that its position is ideal for antennas without any obstruction. The antennas can also benefit from the roof of the car as a ground plane for these antennas. However, due to the aesthetic reason, the shark-fin size and shape is rather small, while hosting several antennas, i.e. usually a GPS antenna, two cellular antennas and may be a WiFi antennas. However, the use of shark-fin has not only advantages. Thus, the interference between the antennas as they are closely spaced can impact the performance of the antenna systems. Furthermore, the shark-fin cannot be used for increasing new applications, such as V2X or future 5G due to the already limited space. Alternative solution is therefore needed.

It is well known for years that spoiler vehicle can also be used as housing for vehicle antennas. For example, in JP2003273617, a wire automotive antenna integrated in the spoiler is described as an alternative to visible vehicle antennas on roof.

It is also known from U.S. Pat. No. 6,927,736, satellite antennas provided in automotive spoilers.

EP1843429A1 and GB2578597A describe multiple antennas arranged in an automotive spoiler. The multiple antennas and radio unit receiver are provided with electronics and electrical device in spoiler, in spoiler. The space inside the spoiler is then limited and the number and the design of antennas to be arranged in the spoiler is then also limited.

These above mentioned prior-arts propose to integrate different type of antennas in the vehicle spoiler. However, none of those presents a systematic approach to integrate multiple antennas in the spoiler vehicle, such that to optimize the performance of the antenna based on its application, at the same time and where several antennas of different applications co-exist in the same spoiler housing.

Today, more and more antennas and different types of antennas are requested to be integrated in the spoiler. The need of diversity of the type of antennas working at high-frequency such as telematics antennas (e.g. cellular, satellite, V2X) and antennas working at lower frequency such as radio broadcast (AM/FM/DAB/TV) antennas and their powering lead to some issues such as:

- the position of the different telematics antennas in order to maximize their performances
- how the antennas of different applications can co-exist in spoiler, such as between high-frequency telematics application and radio broadcast (AM/FM/DAB/TV) at lower frequencies.

SUMMARY OF THE INVENTION

The present invention provides a spoiler assembly for a vehicle, said assembly comprising a spoiler housing having a left and a right lateral extremities, a plurality of antenna elements, wherein the plurality of antenna elements are satellite antennas, telematics antennas including cellular antennas and V2X antennas and the radio broadcast antennas arranged to co-exist in the spoiler while keeping its better performances. The satellite antennas, telematics antennas including cellular antennas and V2X antennas are arranged to project in the required direction with respect to a surface of the spoiler housing. Such arrangement improve the performance of each antenna with respect to its functions, as well as allows the maximum usage of the spoiler for antenna integration.

According to the present invention, the spoiler housing has a lower part and a cover part (upper part), the lower part having an inner surface facing the inner surface of the cover part, the spoiler housing may be made in one or two pieces.

Locating an antenna on the roof of the vehicle in the conventional manner requires a shark-fin type enclosure in order to effectively protect and hide from view the antenna. Such enclosures inevitably have a detrimental effect on the aerodynamics of the vehicle, however. Further, the high data rates required by 4G/5G communication protocols may require multiple antennas. In addition, reception of satellite antennas also benefit from being located on the roof. Having more than one cellular or satellite antenna requires either that the shark fin is increased in size or multiple roof-top antenna enclosures are provided. This has the undesirable effect of further degrading the aerodynamic performance of the vehicle. Further, a shark fin type enclosure is unsightly and poses a design challenge in order for it to not impinge on the aesthetics of the vehicle appearance. Despite attempts to make them pleasing to the eye, shark fin-shaped enclosures on the roof are still visually obtrusive to the detriment of the appearance of the vehicle. Further, if the antennas are placed in a less obtrusive place such as in another external component such as the wing minors, bumper or under the roof then the reception is to some extent compromised and the attenuation problem with coaxial cable is exacerbated. In addition, such locations do not have sufficient volume for optimally configuring an antenna assembly. In the case of an under roof arrangement, to provide the necessary space for an effective antenna assembly would unacceptably compromise the headroom of the vehicle. It also forces a plastic and/or glass roof cover to be used which is detrimental to the mechanical properties of the vehicle.

Having plurality of antenna elements projecting in the required direction (upwardly, downwardly, parallelly to reach the best/required performances) with respect to the spoiler housing allows the antennas to be suitably configured to provide the necessary data throughput and bandwidth requirements required of modern communication standards such as satellite antennas, cellular antennas and telematic (e.g. 2G, 3G, and 4G (LTE) and 5G), GNSS and V2X or Wifi antennas in combination with radio broadcast antennas working at lower frequencies, with little or no aerodynamic penalty that would otherwise be incurred if the antennas were arranged elsewhere on the vehicle, for example in a conventional roof-top enclosure. Further, this arrangement allows high data throughput and connectivity to be achieved without compromising the cabin space or the appearance of the vehicle. In another embodiment, the V2X antenna is for V2V and is compliant with dedicated short-range communications standards such as IEEE 802.11p, as well as the cellular V2X (C-V2X) standard proposed by 3GPP.

According to the present invention, the multiple telematics antenna elements, cellular antennas and radio broadcast antennas are arranged in the spoiler with a position determined by the type of application, the data throughput and bandwidth requirements. Thus, the antenna elements may be configured as an antenna array which allows spatial and temporal multiplexing of received and transmitted signals.

According to the present invention, the spoiler housing has at least a central area (Zone A) and at least one lateral area (Zone B) on both sides of the said central area (Zone A) and in the extremities of the spoiler housing. In the central area (Zone A), related generally to the place where the brake light is positioned, the satellite antennas are arranged. A brake light is a light attached to the rear of a motor vehicle that lights up when the brakes are applied, serving as a warning to following drivers. According to the present invention, the satellites antennas, including GPS for navigation, SDARS for satellite digital audio radio service, satellite communication antennas, are placed close to the center of the spoiler.

In the lateral area (Zone B) on both sides of the central area (Zone A), at least one cellular and/or telematic antenna element is provided. It is understood that the each of the lateral area (Zone B) has one side ending with the extremity of the spoiler housing (right and left extremities).

According to one embodiment of the present invention, at least a V2X and/or a Wifi antenna element is further provided between the satellite antenna elements and the cellular and/or telematics antenna elements. The V2X and/or the Wifi antenna element is provided in an area (Zone C) provided between the central area (Zone A) and the lateral area (Zone B). The V2X antennas, for the Vehicle-to-everything application, are placed vertically and are in between the cellular and the center of the spoiler. There can be a single V2X antenna in the spoiler or a double antennas, which serve to provide coverage of 360 degree around the vehicle.

In case of WiFi antennas are provided, they are placed between the cellular/telematics antennas and the V2X antennas.

Thus, according to one embodiment of the present invention, the spoiler housing may be divided in at least three areas:

a. a central area (Zone A) where the satellite antenna elements are provided, b. at least one lateral area (Zone B) at the left and the right extremities of the spoiler housing, where the cellular antenna elements and/telematic antenna elements are provided;

c. a further area (Zone C) provided between the central area (Zone A) and the lateral are (Zone B) where V2X and/or Wifi antenna elements are provided.

In embodiments, the cellular 2G/3G/4G and 5G antennas are placed off-center, evenly distributed on both side of spoiler, which maximize the diversity and the performance in MIMO system. In embodiments, the telematics including cellular antenna elements in lateral areas (Zone B) are advantageously configured as a Multiple Input Multiple Output (MIMO) array. In embodiments, the number of antenna elements will depend on the required application, for example there can be four cellular antennas for 4G or 5G as required by the known 3GPP. The 3GPP is the third generation partnership project, an organization who defines standards for communication system, such as 4G, 5G. This provides the minimum recommended number of antenna elements for advanced 4G and 5G data applications which require high data throughput. For 5G, for example, it is proposed to use the massive MIMO antenna diversity scheme. Including even more antennas increases the reception diversity further and allows even higher rates of data transmission and reception and enablement of beam forming. For example, in some embodiments, the antenna elements are configured to perform adaptive beamforming, for example, to increase antenna gain where the directivity of a received/transmitted signal has been determined.

Preferably each of the antenna elements are connected to a first transceiver located in a vehicle. The antennas and transceiver act together to receive and transmit signals of a particular type e.g. where the antenna elements are satellite antenna elements such as Global Navigation Satellite System (GNSS) receivers, using the GPS, GLONASS, Galileo or BeiDou system, provided in the central area (Zone A) or are telematics/cellular antennas (2G, 3G, 4G, 5G, LTE) provided in latera area (Zone B) or are V2X and/or Wifi antennas. In another embodiment, the V2X antenna and transceiver are for V2V and is compliant with dedicated short-range communications standards such as IEEE 802.11p, as well as the cellular V2X (C-V2X) standard proposed by 3GPP.

One of the advantage of the antenna system arrangement as proposed in the present invention, is that it allows the co-existence of all described above antennas with the radio broadcast antennas, including AM/FM/DAB/TV, as such these antenna can be made of wire or foil.

In case of the antennas are made of metallic foils 34, the foil antennas can also serve as ground plane for the satellite, V2X antennas, which further improve the performance of these antennas.

In the case of co-existing, the cellular antennas are preferably placed at the extremity of the spoiler, with minimum contact with the foil.

Such V2X antenna elements may be vertically oriented to match the vertical polarization of the transmitter/receiver at a base station or a road-side unit (RSU) with the vehicle in order to optimize signal reception. A road-side unit (RSU) is a device installed on the road in order to communicate with the car, for example for the payment. The projection direction (vertically, horizontally, parallelly) is chosen to allow the antennas to extend into an inconspicuous space without significant aerodynamic penalty which would be incurred by conventional roof top antenna assemblies. This is particularly true if wide bandwidth reception is required because the required antenna length is proportional to the lowest wavelength that is required to be received and/or transmitted.

The antenna elements may be laterally spaced within the spoiler housing to efficiently use the full width of the spoiler and to provide the necessary spacing for spatial decorrelation between the received/transmitted signals at the different antenna elements.

The antenna elements are preferably disposed within the spoiler housing and configured to project in the required direction (downwardly, upwardly, parallelly) with respect to an inner surface of the spoiler housing. For example, the inner surface might be an upper (or uppermost) aerodynamic surface of the spoiler housing.

Advantageously, the spoiler housing may include an upper portion and a lower portion and the antenna elements are arranged to project downwardly from the upper portion to the lower portion. Thus, the upper portion may include an aerodynamic spoiler surface and the lower portion configured to house at least part of the downward antenna elements. Advantageously, the lower portion is a downward facing antenna fin to provide a pleasing vehicle aesthetic that is not detrimental to the aerodynamics of the vehicle. The downward fin may extend only partially across width of the upper aerodynamic portion, e.g. across a central portion, in order to minimize mass and may be configured to have only the volume necessary to house the downward antenna elements.

In other embodiments, the antenna elements are configured to project downwardly from a lower surface of the upper portion. In this way, the upper and lower portions may be conveniently designed and/or manufactured separately. For example, the upper portion may be designed purely based on aerodynamics which the lower portion is designed for holding the antennas. The upper portion and the lower portion may be isolated from each other, which again can simplify manufacture and also permits the thermal, electromagnetic and mechanical properties of lower portion to be designed solely based on the design requirements for the antenna elements and their assembly.

In another aspect of the present invention, there is provided a vehicle including a spoiler assembly as hereinbefore described. Preferably, the vehicle includes a transceiver coupled to the antenna elements. The transceiver may be included in the spoiler housing or located elsewhere in the vehicle.

BRIEF DESCRIPTION OF THE DRAWINGS

In order that the present invention may be more readily understood, embodiments of the invention will now be described, by way of example, with reference to the 5 accompanying drawings, in which.

DETAILED DESCRIPTION OF THE INVENTION

Figure 1:
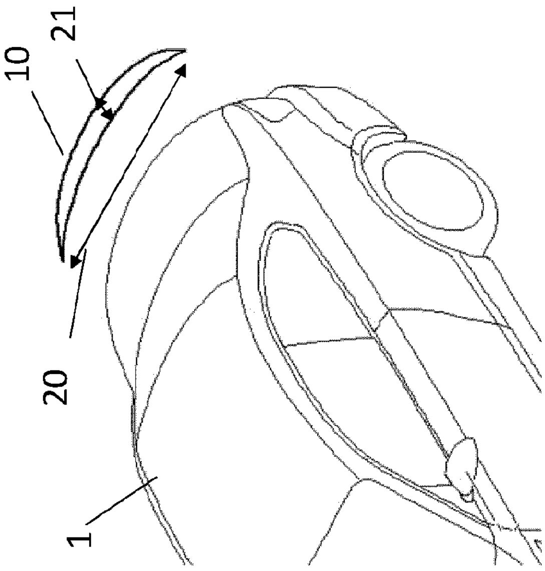
FIG. 1 is an illustrative view of a vehicle including a spoiler assembly according to the present invention.

The vehicle 1 in FIG. 1 is a motor vehicle that includes a rear spoiler 10 mounted at the rear of the vehicle and extending from the roof of the vehicle to provide an aerodynamic surface substantially aligned with the roof of the vehicle to provide a continuous surface. A lateral axis 20 and a longitudinal axis 21 of the vehicle are indicated as shown and references to the lateral and longitudinal axes herewith are with respect to these axes of the vehicle. Although, a motor car is shown, the invention is applicable to other types of motorized vehicle that utilize a spoiler.

According to the present invention, the spoiler housing has a lower part 10*a* and a cover part 10*b* (upper part), the lower part 10*a* having an inner surface facing the inner surface of the cover part, the spoiler housing may be made in one or two pieces.

Figure 2:
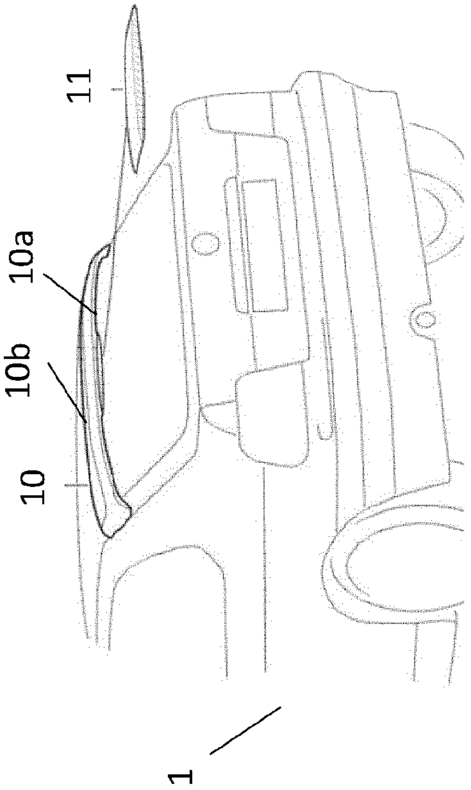
FIG. 2 is a illustrative view including a spoiler assembly with a brake light to illustrate the central area (Zone A)

The FIG. 2 shows a motor vehicle with that includes a rear spoiler 10 mounted at the rear of the vehicle and extending from the roof of the vehicle. The rear spoiler is provided as an example with a brake light 11 in order to define or better understand what it is called the central area in the present invention. The central area (Zone A) is generally related to the area where a brake light 11 is commonly integrated in a spoiler assembly. The central area is also the Zone corresponding to the Zone under the area where the potential brake light is provided.

Figure 3:
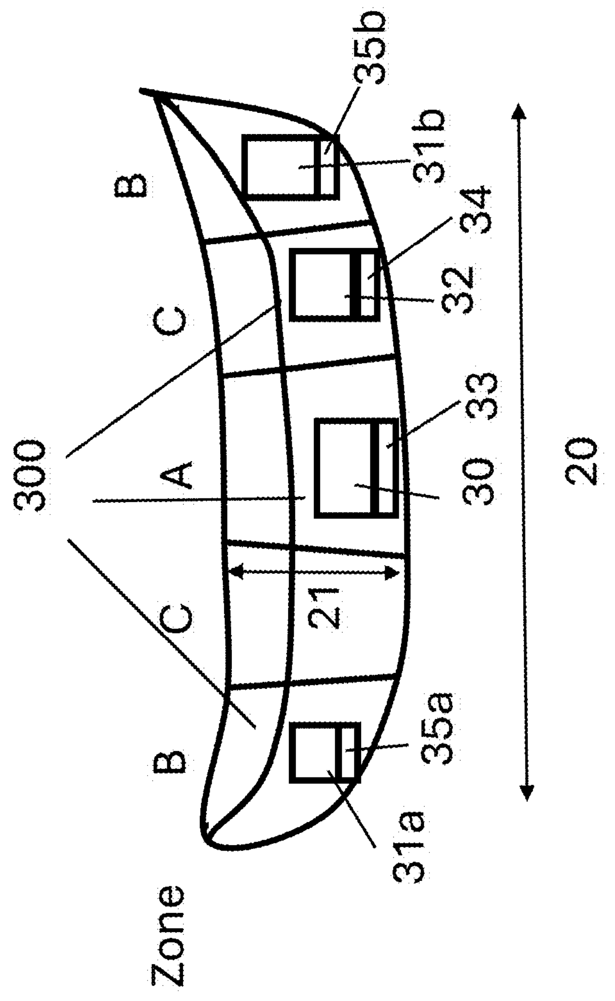
FIG. 3 shows a view of the spoiler assembly with integrated antennas from a perspective viewpoint in an embodiment of the present invention.

As shown in FIG. 3, an antenna assembly 300 are located within the rear spoiler 10. The antenna assembly includes one or more antennas distributed laterally within the spoiler.

FIG. 3 shows an embodiment in which SDARs or GNSS antenna element 30 is placed in the central area (Zone A), a V2X antenna element 32 is placed in the area located between the central area (Zone A) and lateral area (Zone B) and LTE 31*a*, 31*b* antennas are provided in the lateral area at the extremities of the spoiler housing according to the lateral axis 20. The antennas are coupled to a respective receivers. These antennas are configured to be suitable for receiving and transmitting signals in the bandwidth applicable for the respective function. The antennas may be PCB or patch-type antenna, which is often printed on a dielectric substrate, or an array of radiating antenna elements, or a 2D or 3D antenna, which provide a circular polarization, for example. The position of the antennas with different functions according to the present invention allows to combine efficiently different type of antennas while saving spatial crowing. The antennas may be printed antennas or foil antennas, and one or more may be located separately from the communication unit or may be integrated in a circuit board with the modules of the communication unit. Each patch antenna may be formed by a patch or area of conductive material on a substrate. Typically, the patch antenna may be rectangular but this is not necessarily the case. Other shapes are possible, such as a polygonal shape, a T-shape, an L-shape etc. The antennas may be vertically oriented with respect to the spoiler assembly when installed on a vehicle. For example, the antenna surface may be perpendicular to a surface of the spoiler assembly such as an inner surface of the lower part 10*b* of spoiler housing, such a way the antenna would provide the vertical polarization which is preferred for certain application, such as the V2X. Generally, the orientation of the antennas is configured to match the orientation of the transmission antennas, i.e. at a base station or the satellite or a roadside units or the other antenna on another vehicle. For example, satellite broadcast and transmission systems would typically be circularly polarized making a patch antenna suitable for communication and the V2X communication would be vertically polarized making a vertically oriented antenna a suitable choice.

According to a preferred embodiment of the present invention, the antennas are provided onto the inner surface of the lower part 10*a* facing the inner pf the cover part of the spoiler housing 10. However, it is understood that the antennas may be also provided into a fin inside the spoiler housing, the fin being fixed onto the inner surface of the inner part 10*a* and/or the inner surface of the inner surface of the cover part 10*b*, the inner surface of the inner part 10*a* faces the inner surface of the cover part 10*b*.

The satellite antennas 30 may be a satellite navigation antennas (for example for GPS, Baidu or any other similar service) or a satellite digital audio radio service (SDARS) or a satellite communication module for satellite internet or satellite telecommunication. These antennas may be installed alone in the central Zone (Zone A) or may co-exist with other satellite antennas in the same Zone. These antennas can be a patch-type antenna, which is often printed on a dielectric substrate, or an array of radiating antenna elements, or a 2D or 3D antenna, which provide a circular polarization. According to the present invention, satellite antenna element 30 is placed in the central Zone (Zone A), which offers several advantage linked to the performance of the antenna and the service or application. First, the central Zone has a benefit of close to the car-body and having symmetric distance to the both size of the car body, which helps the satellite antennas to have a symmetric radiation pattern, which is critical for the application such as SDARS. Furthermore, these antennas can benefit of the car body as a big ground plane to further improve it gain and performance. As will be clear later on, the satellite antennas can also use the conductive foil 33 of the radio broadcast antennas as a ground plane. These condition further improve the radiation characteristic of the satellite antenna and thus improve the quality of the service.

The LTE (Long Term Evolution)/4G antenna 31*a*-31*b* may comprise an array of antennas arranged in so as to provide spatial diversity including MIMO (multiple-input and multiple-output) functionality to improve data throughput. That is, where one or more of the antennas in the array is used to transmit data and another is used to transmit data. Thanks to the arrangement in this invention, the spatial diversity is further improved since two or more LTE antenna are distributed on lateral Zone (Zone B). Another advantage is that as the lateral Zones are less impacted by the full-car body, one antenna or module can provide coverage on one side of the car, while the other antenna on the other side of the spoiler will cover its side. More than often, the radiation patterns of these antennas on both lateral sides of the spoiler are complement each other, thus the combination of these two or multiple antennas on both lateral Zones provide full-coverage of the vehicle.

Further, the signal to noise ratio of the antenna may be improved according to one embodiment as a particular arrangement of the present invention. The LTE antennas provided in lateral area (Zone B) are used for telecommunications in a 4G telecommunications band, for example, with a highest frequency of 2.6 GHz In this embodiment, an LTE/4G antenna (or antenna array) is shown but other cellular telecommunications bands could be used such as 2G, 3G and 5G.

Two LTE antennas 31*a*, 31*b* are provided which are laterally spaced across lateral axis 20 so as to be spaced across the spoiler housing. The spacing between the LTE antennas is ideally arranged so that there is at least 10 dB of decoupling between the antennas and so that a multiple-input multiple-output configuration is possible. Thus, the space within the spoiler is optimally utilized to provide an LTE antenna array with high data throughput. Each of the antennas 31*a*, 31*b*, may be is a PCB-type antenna comprising a conductive layer arranged on a substrate. However, all other suitable types of antennas may be used including 3D volume antennas, even a 3D metallic antenna since they may be integrated into the spoiler having a certain volume. They may be mounted by means of respective brackets which are fixed to an inner surface of the spoiler. According to car's manufacturer requirement, the number of LTE antennas may be increased. Thus, four LTE may be provided onto the spoiler.

A further V2X antenna 32 is located in the area called Zone C located between the central area (Zone A) and lateral area (Zone B) in the spoiler housing. There may be one or two V2X antenna installed in the spoiler. In a preferred embodiment, in the case of two V2X antennas, those antennas are installed onto Zone C on both side of the assembly spoiler, where one of the antenna provides the coverage for the front of the spoiler, while the other provide coverage for the back of the spoiler. In this configuration, a high-gain antenna can be used, which improves the communication range for V2X application, which is critical for several scenarios such as on the high-way. When only a single V2X antenna is used, the antenna will provide the full-coverage (360 degrees) around the car. In this case the antenna is a type of omnidirectional antenna. It is understood that the number of antenna elements and their shape should be adapted according to car's manufacturer requirements. Thanks to the present invention, and the position as described above, the V2X antenna element may be installed vertically with respect to the spoiler, providing the vertical polarization required for this application, while not being impacted by the presence of the vehicle break-light, which is in the central Zone (Zone A). Also, the Zone C is also far from the extremity of the spoiler (Zone B). Thus the V2X antenna is still able to provide good coverage to the front and surrounding, without less influence of the car-body. This is especially critical for the case of single V2X antenna is used and a 360 degree Coverage surrounding the car is required. One of particular advantage of the present invention is that due to the cost of the hardware and cable, if single V2X antenna can provide full service for V2X communication, it is then a preferable solution for the car's manufacturer, however it is not mandatory.

Thus, thanks to the present invention, an arrangement for multiple antenna service in an spoiler assembly is possible, while still maximizing their respective performance, taken into account the required characteristic of each service and the physical impact of the car body on the service.

The perspective illustration of FIG. 3, showing a section view looking into the spoiler from left to right along the lateral axis 20, shows how the LTE antennas 31-*a*, 31-*b* may be disposed within the inner surface of the lower part 10*a* of the spoiler housing in the lateral areas (Zone B) on both sides of the central area (Zone A), the LTE antennas being closed to the each extremity of the spoiler housing. As shown, a portion of each LTE antenna 31-*a*, 31-*b* projects downwards into a lower part 10*a* of the housing. The lower part 10*a* in this embodiment takes the form of a single downwardly oriented antenna fin forming a portion of the housing. As shown, the laterally spaced antennas are generally aligned with the longitudinal axis 21 which is perpendicular to the lateral axis 22.

By having the vertically oriented antennas 31-*a*, 31-*b* projecting downwardly with respect to an upper aerodynamic surface of the spoiler, they can be kept out of view of an observer of the vehicle, thus making the vehicle appearance more attractive. By having the antennas project downwards, the forward reception will inevitably require signals to travel through the vehicle itself leading to some degradation in the forward antenna gain. However, by selecting a well-suited position for each application in the spoiler housing, as proposed in the present invention, such drawback is compensated by better performance of the antennas. For example, the cellular antennas on both side of the spoilers can be complimentary for each other, i.e. covering different areas, and their combination provides a perfect match.

In an particular embodiment, the spoiler assembly contains radio broadcast antennas, for the analog AM/FM or digital DAB/TV service. In this embodiment, the radio broadcast antennas can be made of wire or of conductive film, such as foil antennas or antennas realized on plastic films, such as PET. The present invention also proposes to place preferably those foil antennas within Zone A and Zone C, with minimal contact to Zone B. Furthermore, the invention proposes to have satellite antennas in Zone A located on top of the foil antennas. This has an advantage of using the foil antenna as a ground plane for the satellite antennas, which further improve the performance of the satellite antennas and at the same time not blocking the communication link of the vehicle with the satellites. Since the design of satellite antenna is rather small, its presence on top of the foil antenna has minimum to no impact on the performance of the foil antenna. The invention further proposes to place the foil antenna beneath the V2X antennas and or WiFi antennas in Zone C. Since for V2X antenna, the communication is happening in the horizontal plane or at certain elevation, while not beneath the spoiler direction, therefore the presence of a foil antenna beneath will act as a ground plane, which further improve the performance of the V2X antennas. Again, as the V2X antennas are often mounted vertically, the overlap area on the foil antenna is rather limited, which has minimum to no impact on the performance of the foil antennas. Finally, the foil antennas, in the designing phase, can already anticipate the presence of these antennas, thus including any impact if needed. In this embodiment, the cellular or telematics antennas in Zone B are preferably have minimal contact with the foil antenna. In case of desirable, the cellular antennas or telematics antennas are proposed to installed on top of the foil antenna. In this case, the foil antenna 35*a* and 35*b* will act as the ground plane for the cellular and telematics antennas. For certain designs of cellular or telematics antennas, this configuration brings significant advantage as the ground plane for these antennas is enlarged thanks to the foil antennas, thus further improve the performance of these cellular or telematics antennas.

In this embodiment, the lower portion 10*a* is integrally formed with the cover (upper) part 10*b* of the spoiler housing 10. However, in other embodiments the spoiler housing may be formed of two distinct component parts, one comprising the cover (upper) portion 10*b* and the other the lower part 10*a*.

Thus, an example of an arrangement of the LTE antennas 31*a*, 31*b* may be configured in the manner that they are enclosed in spoiler housing under fin. In other embodiments the lower part 10*a* of the spoiler housing may comprise multiple fins each enclosing one or more antennas.

In another embodiment, a portion of the antenna resides inside an upper portion of the lower part of the housing 10*a*. This has the advantage of making use of the available space in the aerodynamic part of the spoiler and minimizing the space required by the lower part 10*a* of the housing which may be detrimental to the overall weight and aerodynamic performance of the spoiler. However, in other embodiments the entirety of the antenna may project downwardly from or below a plane generally corresponding to a boundary between the upper and lower portion such that substantially the entirety of the vertically oriented antenna elements are contained within the lower part.

In the above embodiments the antennas are oriented vertically within the spoiler assembly but in other embodiments they may project generally downwardly by being oriented at an angle with respect to the vertical axis. This can assist in reducing the downward space required or fitting the antenna within a given geometry of the spoiler housing without unduly compromising antenna reception.

As another embodiment whereby the antenna is disposed at 45 degrees with respect to the vertical axis. This design freedom can assist in reducing the space required within the spoiler housing and for fitting the antenna within a given geometry of the spoiler housing without unduly compromising antenna reception i.e. due to the change in orientation.

In FIG. 3, the cellular antennas are provided in the lateral area (Zone B). As mentioned above, the antennas may be configured as an array to increase data throughput, for example, by a MIMO configuration. This is particularly important for high data rate protocols such as 4G and 5G and potentially for future uses of V2X protocols. As will be appreciated further cellular antennas could be included in the spoiler housing to further increase the data throughput for such configurations without incurring any significant aerodynamic penalty for a vehicle. In addition, in embodiments the depth of the spoiler housing can be suitably increased to accommodate longer vertical antennas to provide greater signal bandwidth. In another application, the antennas may be configured to receive or transmit signals using a beam forming technique. This can be used for identification of the direction of a received signal and further to focus the directivity of antenna reception or transmission to improve antenna gain in that direction. The beamforming capabilities are improved with further antennas and thus the extra space made possible by having the antennas projecting downwardly from a surface of the spoiler can be usefully leveraged to provide these additional or improved functionalities without affecting the vehicle aerodynamics, for example.

In the above embodiments a V2X receiver/transceiver and associated antenna is described. In one embodiment, the V2X receiver/transceiver and antenna are for V2V (vehicle-to-vehicle) communications and are compliant with a dedicated short-range communications (DSRC) standard such as IEEE 802.11p, as well as C-V2X standard.

The invention claimed is:

1. A spoiler assembly for a vehicle, said assembly comprising:

a. a spoiler housing having left and right extremities and having a lower part and a cover part, the lower part having an inner surface facing an inner surface of the cover part;

b. a plurality of antenna elements; wherein the plurality of antenna elements are arranged on a surface of the spoiler housing, and the antenna elements work at different frequency ranges;

c. wherein the spoiler housing has at least a central area and at least one lateral area on both sides of the central area and in the extremities of the spoiler housing, wherein in the central area, at least one satellite antenna element is provided, and in at least one lateral area at left and the right extremities of the spoiler housing, at least one cellular antenna element and/or telematic antenna element is provided, wherein at least one radio broadcast antenna is provided, providing service for an analog signal or a digital signal and the at least one broadcast antenna is made of wire or metallic foil or a flexible film with printed metallic pattern, where the metallic foil or flexible film is placed underneath the at least one satellite antenna element in the central area, acting as a ground plane for the at least one satellite antenna element.

2. The spoiler assembly according to claim 1, wherein a further area placed between the central area and the lateral area is provided with V2X and/or Wifi antenna elements.

3. The spoiler assembly according to claim 2, wherein at least a WiFi antenna is placed between the at least one telematic and/or cellular antenna elements and the V2X antenna.

4. The spoiler assembly according to claim 2, wherein first and second V2X antenna elements are provided, the first V2X element and the second V2X element having a same or different orientation or a same or different shape.

5. The spoiler assembly according to claim 2, wherein the at least one radio broadcast antenna is made of wire or metallic foil or a flexible film with printed metallic pattern, where the metallic foil or flexible film is placed underneath the V2X antenna, acting as a ground plane for the V2X antenna.

6. The spoiler assembly according to claim 1, wherein in the central area, at least one satellite antenna working at a frequency comprised between 1 and 40 GHz, is provided.

7. The spoiler assembly according to claim 1, wherein antenna elements provided in a lateral Zone are configured as a Multiple Input Multiple Output array (MIMO).

8. The spoiler assembly according to claim 1, wherein the at least one antenna element provided in the central area is a satellite antenna chosen amongst satellite radio, GPS navigation, satellite internet and satellite communication.

9. The spoiler assembly according to claim 1, wherein the antenna elements provided in the lateral area are one of 2G, 3G, 4G, LTE, 5G antennas.

10. The spoiler assembly according to claim 1, wherein more than one LTE antenna elements are provided.

11. The spoiler assembly according to claim 1, wherein the antenna elements are laterally spaced apart within the spoiler housing.

12. The spoiler assembly according to claim 1, wherein the at least one radio broadcast antenna is made of wire or metallic foil or a flexible film with printed metallic pattern, where the metallic foil or flexible film is placed next to or underneath the at least one cellular and/or telematic antenna elements at a lateral Zone.

13. The spoiler assembly according to claim 12, wherein the at least one cellular antenna is not overlapping the at least one radio broadcast antenna to reduce mutual-influence between the services.

14. A vehicle comprising a spoiler according to claim 1.

15. A spoiler assembly for a vehicle, said assembly comprising:

a. a spoiler housing having left and right extremities and having a lower part and a cover part, the lower part having an inner surface facing an inner surface of the cover part;

b. a plurality of antenna elements; wherein the plurality of antenna elements are arranged on a surface of the spoiler housing, and the antenna elements work at different frequency ranges;

c. wherein the spoiler housing has at least a central area and at least one lateral area on both sides of the central area and in the extremities of the spoiler housing, wherein in the central area, at least one satellite antenna element is provided, and in at least one lateral area at left and the right extremities of the spoiler housing, at least one cellular antenna element and/or telematic antenna element is provided, wherein at least one radio broadcast antenna is provided, providing service for an analog signal or a digital signal and the at least one radio broadcast antenna is made of wire or metallic foil or a flexible film with printed metallic pattern, where the metallic foil or flexible film is placed underneath a V2X antenna, acting as a ground plane for the V2X antenna.

16. The spoiler assembly according to claim 15, wherein a further area placed between the central area and the lateral area is provided with the V2X and/or Wifi antenna elements.

17. The spoiler assembly according to claim 16, wherein at least a WiFi antenna is placed between the at least one telematic and/or cellular antenna elements and the V2X antenna.

18. The spoiler assembly according to claim 15, wherein in the central area, at least one satellite antenna working at a frequency comprised between 1 and 40 GHz, is provided.

19. The spoiler assembly according to claim 15, wherein the antenna elements provided in a lateral Zone is configured as a Multiple Input Multiple Output array (MIMO).

20. A vehicle comprising a spoiler according to claim 15.

* * * * *